United States Patent
Yu et al.

(10) Patent No.: US 12,366,227 B2
(45) Date of Patent: Jul. 22, 2025

(54) METHOD AND APPARATUS FOR CONTROLLING REACTIVE POWER OF WIND TURBINE, AND WIND FARM

(71) Applicant: XINJIANG GOLDWIND SCIENCE & TECHNOLOGY CO., LTD., Urumqi (CN)

(72) Inventors: Lianfu Yu, Beijing (CN); Di Xiao, Beijing (CN); Xianwen Bao, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 543 days.

(21) Appl. No.: 17/780,010

(22) PCT Filed: Jun. 10, 2020

(86) PCT No.: PCT/CN2020/095381
§ 371 (c)(1),
(2) Date: May 25, 2022

(87) PCT Pub. No.: WO2021/103482
PCT Pub. Date: Jun. 3, 2021

(65) Prior Publication Data
US 2022/0412312 A1    Dec. 29, 2022

(30) Foreign Application Priority Data
Nov. 26, 2019 (CN) .......................... 201911174179.1

(51) Int. Cl.
*F03D 7/04* (2006.01)
*H02J 3/16* (2006.01)

(52) U.S. Cl.
CPC ............. *F03D 7/048* (2013.01); *F03D 7/046* (2013.01); *H02J 3/16* (2013.01);
(Continued)

(58) Field of Classification Search
USPC ........................................................ 700/267
See application file for complete search history.

(56) References Cited

U.S. PATENT DOCUMENTS

| | | | |
|---|---|---|---|
| 2010/0237834 A1 | 9/2010 | Alonso Sadaba et al. | |
| 2011/0101689 A1 | 5/2011 | Larsen et al. | |

(Continued)

FOREIGN PATENT DOCUMENTS

| | | |
|---|---|---|
| CN | 102064563 A | 5/2011 |
| CN | 102496938 A | 6/2012 |

(Continued)

OTHER PUBLICATIONS

First Office Action in related India Application No. 202217029122 dated Sep. 29, 2022 (7 pages).
(Continued)

*Primary Examiner* — Emilio J Saavedra
(74) *Attorney, Agent, or Firm* — Bayes PLLC

(57) ABSTRACT

Methods and apparatuses for controlling reactive power of a wind turbine, and a wind farm are provided. An exemplary method includes: obtaining operation data of single wind turbines in a wind turbine group at the current time point; determining the total maximum capacitive reactive capacity and total minimum inductive reactive capacity, satisfying a safety constraint condition at the next time point, of the wind turbine group; calculating a deviation value of a wind turbine group reactive instruction at the current time point; and updating the wind turbine group reactive instruction on the basis of the acquired, determined, and calculated data so as to perform reactive power control.

20 Claims, 9 Drawing Sheets

(52) U.S. Cl.
CPC ..... *F05B 2270/337* (2013.01); *H02J 2300/28* (2020.01); *Y02E 40/30* (2013.01)

(56) References Cited

U.S. PATENT DOCUMENTS

| | | | |
|---|---|---|---|
| 2014/0062086 A1* | 3/2014 | Mata Dumenjo | H02J 3/472 290/44 |
| 2015/0148974 A1* | 5/2015 | Diedrichs | F03D 7/048 700/287 |
| 2017/0244347 A1 | 8/2017 | Garcia et al. | |
| 2017/0250540 A1* | 8/2017 | Varma | H02J 3/46 |
| 2018/0076622 A1 | 3/2018 | Wilkins et al. | |
| 2019/0145376 A1 | 5/2019 | Hardwicke, Jr. et al. | |

FOREIGN PATENT DOCUMENTS

| | | |
|---|---|---|
| CN | 102611118 A | 7/2012 |
| CN | 102882229 A | 1/2013 |
| CN | 103053088 A | 4/2013 |
| CN | 103514281 A | 1/2014 |
| CN | 103515967 A | 1/2014 |
| CN | 104377728 A | 2/2015 |
| CN | 104935073 A | 9/2015 |
| CN | 105226716 A | 1/2016 |
| CN | 106795859 A | 5/2017 |
| CN | 107579540 A | 1/2018 |
| CN | 108494020 A | 9/2018 |
| CN | 108964148 A | 12/2018 |
| CN | 109617116 A | 4/2019 |
| CN | 109672228 A | 4/2019 |
| EP | 2236820 A2 | 10/2010 |
| KR | 20130110742 A | 10/2013 |
| WO | 2019145376 A1 | 8/2019 |

OTHER PUBLICATIONS

Extended European Search Report in related European Application No. 20894668.1 dated Jan. 24, 2023 (16 pages).
Australian Office Action in related Australian Application No. 2020389525 dated Feb. 6, 2023 (3 pages).
Notice of Hearing in related Indian Application No. 202217029122 dated Apr. 26, 2024 (2 pages).
International Search Report in corresponding International Application No. PCT/CN2020/095381 dated Aug. 31, 2020 (12 pages).
First Office Action in related Chinese Application No. 201911174179.1, dated Mar. 25, 2022 (10 pages).

* cited by examiner

METHOD AND APPARATUS FOR CONTROLLING REACTIVE POWER OF WIND TURBINE, AND WIND FARM

CROSS-REFERENCE TO RELATED APPLICATIONS

This application is the national phase of International Application No. PCT/CN2020/095381, filed on Jun. 10, 2020, which claims the priority to Chinese Patent Application No. 201911174179.1, filed on Nov. 26, 2019. The entire contents of each of the above-identified applications are expressly incorporated herein by reference.

TECHNICAL FIELD

The present disclosure relates to the technical field of wind power generation, and in particular to a method and an apparatus for controlling reactive power of a wind turbine, and a wind farm.

BACKGROUND

Unlike a traditional centralized reactive power compensation device, a system access point of a new energy power generation device, such as a wind turbine and a photovoltaic, is not located inside the substation. Generally, the centralized reactive power compensation device is directly connected to a low-voltage bus of the substation, while access points of a wind turbine and a photovoltaic inverter are located far away from the low-voltage bus. Especially for the wind turbine, due to an impact of terrain and climate, a collection line is usually more than ten kilometers or even tens of kilometers long, while the wind turbines are scattered in different locations. As a result, the wind turbine is affected by line parameters, active power flow and reactive power flow, and the voltage of the wind turbine changes within a wide range. The reactive power flow seriously affects the voltage of the wind turbine. The nominal power factor of a wind turbine normally ranges from −0.95 to +0.95, and the voltage of the wind turbine under the normal operation ranges from 0.9 pu to 1.1 pu. However, the voltage of the wind turbine will fluctuate widely under an impact of the reactive power. Thus, the voltage of the wind turbine may has been reached a predetermined value of a high/low voltage ride through of the wind turbine before the power factor of the wind turbine reaches 0.95, resulting in that the wind turbine reports a high/low voltage ride through fault, which is not beneficial to the stable operation of the wind turbine, and may impact the system and bring unnecessary economic losses to the owner if the high/low voltage ride through fault occurs in a large area.

As for the conventional method for controlling reactive power of a new energy power generation device, the control and use of the reactive power of each wind turbine are uniformly deployed by an Automatic Voltage Control (AVC) system or a wind turbine group controller in the station. In the method, it is simply considered upper and lower limits of the reactive power capability of each wind turbine, but is not considered whether the stable operation of the wind turbine is affected due to the problem of reactive power during the receipt of a reactive power command and the execution of the command since the wind turbine is located at the end of the system. Therefore, the wind turbine often reports a fault due to the reactive power allocation.

SUMMARY

A method and an apparatus for controlling reactive power of a wind turbine, and a wind farm are provided according to the exemplary embodiments of the present disclosure, so as to prevent the wind turbine from reporting a fault due to an excessively high voltage or an excessively low voltage while guaranteeing the maximized utilization of reactive power capability of the wind turbine, and ensure that a single capability provided by the wind turbine to a reactive voltage regulation system of the wind turbine group is within an safety threshold range, and ensure that a reactive set value received by the wind turbine can be executed smoothly without affecting the safe and stable operation of the wind turbine.

A method for controlling reactive power of a wind turbine is provided according to an exemplary embodiment of the present disclosure. The method includes: acquiring operation data of each wind turbine in a wind turbine group at a current moment in response to a reactive power command of the wind turbine group, where the reactive power command of the wind turbine group includes a reactive power command of each wind turbine at the current moment; determining a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment and boundaries of a voltage safety range; calculating a reactive power command deviation of the wind turbine group at the current moment, based on the reactive power command of each wind turbine at the current moment and the operation data of each wind turbine at the current moment; and updating the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

An apparatus for controlling reactive power of a wind turbine is provided according to an exemplary embodiment of the present disclosure. The apparatus includes: a data acquisition unit, configured to acquire operation data of each wind turbine in a wind turbine group at a current moment in response to a reactive power command of the wind turbine group, where the reactive power command of the wind turbine group includes a reactive power command of each wind turbine at the current moment; a reactive power capability determination unit, configured to determine a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment and boundaries of a voltage safety range; a deviation calculation unit, configured to calculate a reactive power command deviation of the wind turbine group at the current moment, based on the reactive power command of each wind turbine at the current moment and the operation data of each wind turbine at the current moment; and a command updating unit, configured to update the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, so as to control reactive power of each wind turbine in the wind turbine group based on the updated reactive power command of the wind turbine group.

A wind farm is provided according to an exemplary embodiment of the present disclosure. The wind farm includes: a wind turbine group, including at least one wind turbine connected to a collection line; a reactive power compensation device, configured to provide reactive power compensation for the wind farm; a data collector, configured to collect operation data of each wind turbine in the wind turbine group at a current moment, where the operation data at least includes an actual reactive power, three-phase voltages at a grid side, and an actual active power; and a reactive power control device, communicatively connected with the at least one wind turbine, the reactive power compensation device and the data collector, where the reactive power control device is configured to: determine a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment and boundaries of a voltage safety range; calculate a reactive power command deviation of the wind turbine group at the current moment, based on the reactive power command of each wind turbine at the current moment and the operation data of each wind turbine at the current moment; and update the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

The method and the apparatus for controlling reactive power of a wind turbine according to the exemplary embodiments of the present disclosure are based on the adaptive evaluation of the reactive power capability of the wind turbine, which are mainly used to correctly evaluate the reactive power capability operated by the wind turbine during regulation of the reactive power of the wind farm, and reasonably allocate the reactive power of the wind turbine accordingly, so that the reactive power of each wind turbine and the overall reactive power of the wind turbine group meet the requirements in the control commands, to meet a reactive power control accuracy without exceeding the maximum real-time capacitive reactive power capability and the maximum real-time inductive reactive power capability of the wind turbine, and the wind turbine is prevented from entering into a faulty state due to changes in reactive power. Therefore, it is to prevent the wind turbine from reporting a fault due to an excessively high voltage or an excessively low voltage while guaranteeing the maximized utilization of reactive power capability of the wind turbine, and ensure that a single capability provided by the wind turbine to a reactive voltage regulation system of the wind turbine group is within an safety threshold range, and ensure that a reactive set value received by the wind turbine can be executed smoothly without affecting the safe and stable operation of the wind turbine.

Additional aspects and/or advantages of the general concept of the present disclosure are partially illustrated in the following descriptions and, in part, will be obvious from the description, or may be learned by implementing the general concept of the present disclosure.

BRIEF DESCRIPTION OF THE DRAWINGS

The above and other objectives and features of the exemplary embodiments of the present disclosure will be clearer by the following descriptions in conjunction with the accompanying drawings of the exemplary embodiments, in which.

DETAILED DESCRIPTION

Figure 1:
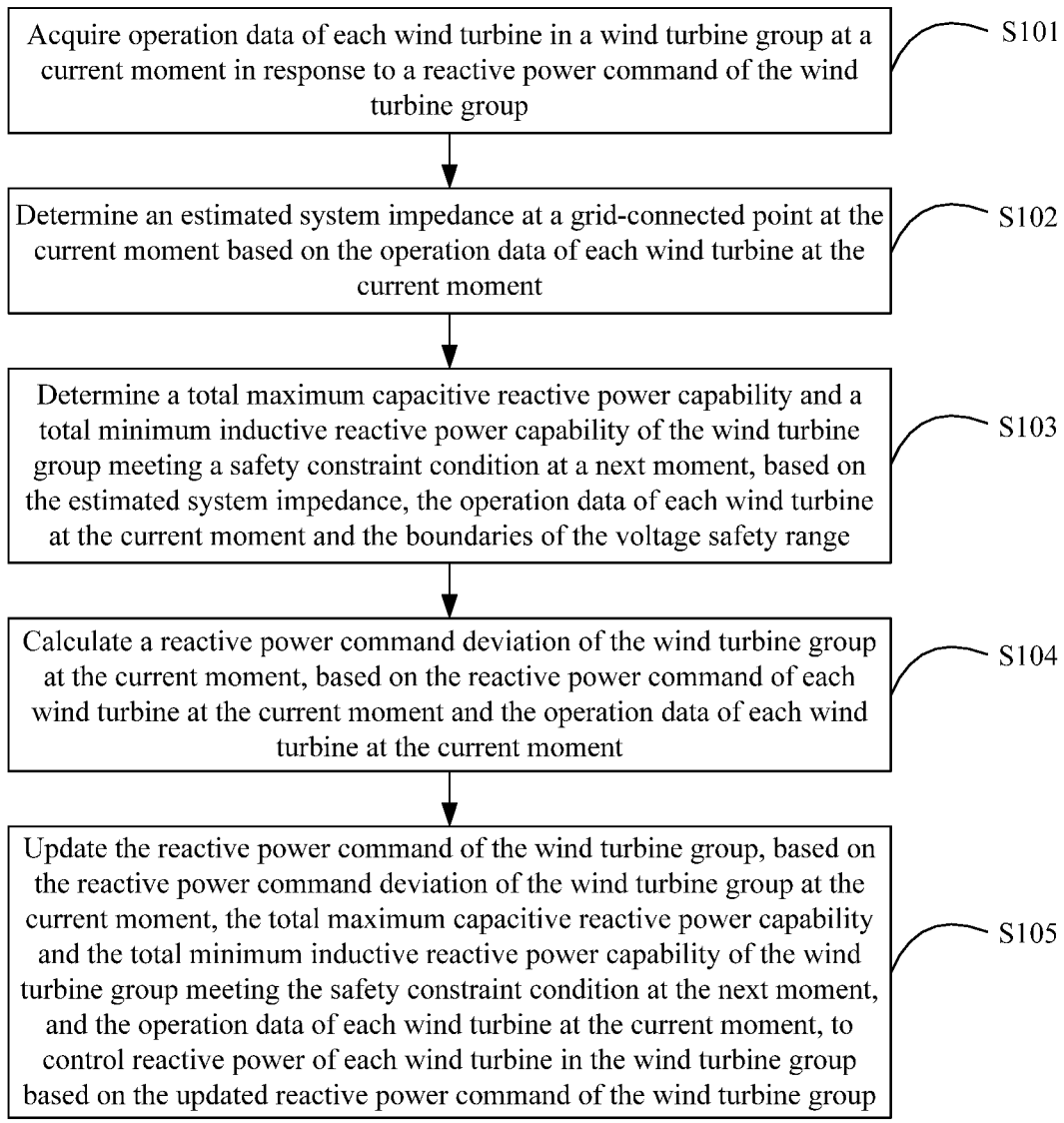
FIG. 1 shows a flow chart of a method for controlling reactive power of a wind turbine according to an exemplary embodiment of the present disclosure.

Reference will be made in detail to the exemplary embodiments of the present disclosure, and examples of the embodiments are shown in the accompanying drawings. In the drawings, the same reference numbers always represent the same components. Hereinafter, the embodiments will be described below in conjunction with the accompanying drawings so as to explain the present disclosure.

In an exemplary embodiment of the present disclosure, an automatic voltage control (AVC) device is a device or a system for controlling a reactive voltage in a power system. System impedance is an impedance seen from a power access point to a power source side, and is called as an impedance of the power system, namely, an internal resistance of the power source. A static var generator (SVG) includes a voltage source converter connected in parallel to the system. The capacitive reactive current or the inductive reactive current outputted by the static var generator can be continuously adjustable and is independent of a system voltage within an operable system voltage range. A static var compensator (SVC) includes a thyristor controlled reactor and a thyristor switched capacitor, and the reactive power outputted by the static var compensator is related to the voltage since the thyristor reacts quickly to a control signal and the on-off times of the thyristor are unlimited.

The present disclosure is based on an AVC control system or a wind turbine group controller. The AVC control system is a station control layer AVC system, and controls the reactive power of the centralized reactive power compensation device (such as an SVG, an SVC, and a passive filter compensation device FC) and the reactive power of wind turbine in the station. The wind turbine group controller is a controlled sub-module in the station control layer AVC system, and mainly receives a reactive power command from the station control layer AVC system and transmits the reactive power command to a single wind turbine based on the reactive power capability of the wind turbine. The system includes main modules such as a reactive voltage control module, a communication server, a switch and the like.

The traditional reactive power control algorithm mostly focuses on the coordination of control accuracy and reactive power allocation, which does not have much impact on the traditional centralized reactive power compensation device. However, for a wind farm in which wind turbines are located far away from a booster station due to the particularity of the overall layout, the voltage of the wind turbine is sensitive to the reactive power, resulting in a great limitation to the traditional control strategy in which the reactive power is allocated simply based on the reactive power capability of the wind turbine without considering the impact of the increase in reactive power on the voltage of the wind turbine.

In the conventional reactive power control method, the reactive power control, especially reactive power allocation, is performed only based on the reactive power capability currently reported by the wind turbine. Actually, the reactive power capability reported by the wind turbine is set based on the power factor of 0.95 specified in the standard GB/T19963. Alternatively, the reactive power control is performed simply in consideration of the limitation of the PQ curve of the wind turbine, while actually the reactive power of the wind turbine is not only affected by the static limitation of the PQ curve, but also has an impact on the voltage of the wind turbine. Depending on different operation states of the system, the increase and decrease of the reactive power will have a different impact on the voltage of the wind turbine, resulting in that the voltage of the wind turbine was still within from 0.9 pu to 1.0 pu required in the standard GB/T 19963 at a previous moment, but exceeds the safety range and enters into a faulty state at a next moment due to the impact of the reactive power. The voltage of the wind turbine increases with the increase of the capacitive reactive power, and decreases with the increase of inductive reactive power. There is such operation state in the system, that is, when the voltage of the wind turbine is high, in response to the system voltage control, the capacitive reactive power outputted by the wind turbine needs to be increased, so as to raise a bus voltage of the station. At this time, the wind turbine may, at a high probability, report a high voltage fault or may enter into in a high voltage ride through state. Alternatively, there is such operation state in the system, that is, when the voltage of the wind turbine is low, in response to the system voltage control, the inductive reactive power outputted by the wind turbine needs to be increased, so as to decrease the bus voltage of the station. At this time, the wind turbine may, at a high probability, report a low voltage fault or may enter into in a low voltage ride through state.

In the conventional solution for controlling reactive power of a wind turbine, the reactive power of the wind turbine is controlled based on a maximum reactive power capability limit of the wind turbine, while the reactive power capability limit cannot be adjusted. Moreover, the conventional solution does not consider an impact of the reactive power of the wind turbine itself on the voltage of the wind turbine, and the following problems may be caused.

1. The wind turbine runs a reactive power command, while the reactive power command is issued according to fixed upper and lower limits of reactive power of the wind turbine, resulting in that the wind turbine reports a fault of a high voltage or a low voltage at a grid side, and even that the wind turbine enters into a high/low voltage ride through state.
2. Though in consideration of the voltage of the wind turbine, however, the real-time reactive power capability of the wind turbine is not effectively adjusted and evaluated according to the system state, resulting in that the wind turbine triggers the protection first, and the reactive power of the wind turbine has not been completely outputted, thus affecting the adjustment accuracy of the reactive power of the whole station.

In order to solve the problem that, in the field-level reactive power control of the wind turbine in a wind farm, the wind turbine may enter into a faulty operation state from a normal operation state due to the change of the reactive power of the wind turbine, a comprehensive analysis is performed on dependent variables related to the change of the reactive power of the wind turbine in the present disclosure, including an impact P(Q) of the reactive power on the active power, an impact V(Q) of the reactive power on the voltage, and an impact I(Q) of the reactive power on the current. That is, in conjunction with the PQ curve, PV curve, rated capacity $S_n$ of the wind turbine, boundaries $V_{max}$ and $V_{min}$ of the voltage safety range of the wind turbine, and a boundary $I_{max}$ of the current safety range of the wind turbine, and in real-time calculation of the system impedance $X_s$ online, at the same time, in collection of the measured reactive power $P_{meas}$, three-phase voltages $U_{ameas}$, $U_{bmeas}$, and $U_{cmeas}$, three-phase currents $I_{ameas}$, $I_{bmeas}$, and $I_{cmeas}$ of the wind turbine, and in communication through a fast communication protocol, a reactive power capability of the wind turbine at a next moment under the current operation state is calculated and evaluated based on a calculated system impedance and a real-time collected data to obtain a maximum capacitive reactive power capability $Q_{max}$ and a minimum inductive reactive power capability $Q_{min}$ of the wind turbine, and reactive power of a single wind turbine is reasonably allocated based on a predicted reactive power capability and in connection with the current reactive power control deviation $\Delta Q_{sum}$ of the wind turbine group, so as to ensure that the change of the reactive power of the wind turbine, due to a reactive power $\Delta Q_i$ newly added for a single wind turbine, meets the safety constraint conditions such as P(Q), V(Q), I(Q), $V_{max}$, and $V_{min}$. The reactive power of the wind turbine is predicted in real time, to ensure that a reactive power command in a next control period can be fully executed by the wind turbine, without resulting in an incomplete adjustment of the reactive power of the wind turbine due to that an actual reactive power is affected when the wind turbine enters into a limited range or an abnormal operation state, thereby further to ensure the accuracy and stability of the control of the reactive power of the wind turbine group or the AVC system.

FIG. 1 shows a flow chart of a method for controlling reactive power of a wind turbine according to an exemplary embodiment of the present disclosure. The method for controlling reactive power may be applied to a reactive power controller for a wind turbine group, and a station control layer AVC device. In FIG. 1, a wind turbine group controller is taken as an example for illustration.

Referring to FIG. 1, in step S101, operation data of each wind turbine in a wind turbine group at a current moment is acquired in response to a reactive power command of the wind turbine group. Here, the reactive power command of the wind turbine group may include a reactive power command of each wind turbine, and the reactive power command of each wind turbine may include a reactive power command of a corresponding wind turbine at the current moment. The operation data may at least include an actual reactive power, three-phase voltages at a grid side, and an actual active power. In addition, the operation data may further include three-phase currents at the grid side.

Specifically, the wind turbine group controller firstly receives a reactive power command of the wind turbine group issued by the station control layer AVC system. Then, an collection layer collects an actual reactive power $Q_{meas}$, three-phase voltages $V_{ameas}$, $V_{bmeas}$, and $V_{cmeas}$ at the grid side, three-phase currents $I_{ameas}$, $I_{bmeas}$, and $I_{cmeas}$ at the grid side, and an actual active power of each wind turbine in response to the reactive power command of the wind turbine group, and transmits the collected data to the controller.

In step S102, an estimated system impedance at a grid-connected point at the current moment is determined based on the operation data of each wind turbine at the current moment.

In an exemplary embodiment of the present disclosure, in determining the estimated system impedance at the grid-connected point at the current moment based on the operation data of each wind turbine at the current moment, it may be determined the estimated system impedance at the grid-connected point at the current moment based on the three-phase voltages at the grid side and the actual reactive power of each wind turbine at the current moment.

In an exemplary embodiment of the present disclosure, in determining the estimated system impedance at the grid-connected point at the current moment based on the three-phase voltages at the grid side and the actual reactive power of each wind turbine at the current moment, it may be determined whether over-voltage processing or under-voltage processing is required for each wind turbine. It is determined that the over-voltage processing or the under-voltage processing is required, if any one of three-phase voltages at the grid side of any one of wind turbines exceeds the voltage safety range. In a case that the over-voltage processing or under-voltage processing is not required for each wind turbine, it is determined the estimated system impedance at the grid-connected point at the current moment, according to the three-phase voltages at the grid side and the actual reactive power of each wind turbine at the current moment, as well as three-phase voltages at the grid side and an actual reactive power of each wind turbine at a previous moment. In determining whether the over-voltage processing or under-voltage processing is required, it may be calculated, for any one of the wind turbines, a largest one and a smallest one among the three-phase voltages of the wind turbine based on the three-phase voltages at the grid side of the wind turbine, and then determined whether the three-phase voltages at the grid side of the wind turbine are within the voltage safety range based on the largest one and the smallest one of the three-phase voltages of the wind turbine.

Specifically, for any one of the wind turbines, in determining whether the over-voltage processing or under-voltage processing is required, it may be calculated the largest one $V_{max}$ of the three-phase voltages according to an equation $V_{max}=\min(V_{ameas}, V_{bmeas}, V_{cmeas})$, and calculated the smallest one $V_{min}$ of the three-phase voltages according to an equation $V_{min}=\min(V_{ameas}, V_{bmeas}, V_{cmeas})$. Then, it may be compared the largest one $V_{max}$ of the three-phase voltages with an upper boundary $V_{capBundary}$ of the voltage safety range, and compared the smallest one $V_{min}$ of the three-phase voltages with a lower boundary $V_{indBundary}$ of the voltage safety range. If the largest one $V_{max}$ of the three-phase voltages is less than the upper boundary of the voltage safety range and the smallest one $V_{min}$ of the three-phase voltages is greater than the lower boundary of the voltage safety range, it is determined that the three-phase voltages at the grid side of the wind turbine are within the voltage safety range [$V_{indBundary}$, $V_{capBundary}$] and it is determined that the over-voltage processing or the under-voltage processing is not required; else, it is determined that at least one of the three-phase voltages at the grid side of the wind turbine exceeds the voltage safety range [$V_{indBundary}$, $V_{capBundary}$] and it is determined that the over-voltage processing or the under-voltage processing is required. Here, values of $V_{indBundary}$ and $V_{capBundary}$ may be selected with reference to a voltage safety and stable operation range, an engineering experience value of the $V_{indBundary}$ is 1.09 pu and an engineering experience value of the $V_{capBundary}$ is 0.91 pu, which is not limited in the present disclosure.

In an exemplary embodiment of the present disclosure, in determining the estimated system impedance at the grid-connected point at the current moment based on the three-phase voltages at the grid side and the actual reactive power of each wind turbine at the current moment and the three-phase voltages at the grid side and the actual reactive power of each wind turbine at the previous moment, it may be calculated a calculated system impedance at the grid-connected point at the current moment based on the three-phase voltages at the grid side and the actual reactive power of each wind turbine at the current moment and the three-phase voltages at the grid side and the actual reactive power of each wind turbine at the previous moment. Then, it may be compared the calculated system impedance at the current moment with an averaged system impedance. In a case that a difference between the calculated system impedance at the current moment and the averaged system impedance does not exceed a predetermined deviation range, it is determined the calculated system impedance at the current moment as the estimated system impedance at the current moment; in a case that the difference between the calculated system impedance at the current moment and the averaged system impedance exceeds the predetermined deviation range, it is determined the averaged system impedance as the estimated system impedance at the current moment.

Specifically, the calculated system impedance at the grid-connected point at the current moment may be calculated by the following equation:

$$X_s = \frac{V_+ - V_-}{\frac{Q_+}{V_+} - \frac{Q_-}{V_-}}$$

where $V_-$ and $Q_-$ respectively represent a voltage of the wind turbine and a total reactive power outputted by the wind turbine in calculating the system impedance last time (that is, at the previous moment), and $V_+$ and $Q_+$ respectively represent a voltage of the wind turbine and a total reactive power outputted by the wind turbine in calculating the system impedance this time (that is, at the current moment).

Specifically, in order to avoid great errors in calculating the system impedance at the grid-connected point due to the fluctuation of the grid system, it is required to compare the calculated system impedance at the current moment with the averaged system impedance. In a case that the difference between the calculated system impedance at the current moment and the averaged system impedance does not exceed a deviation threshold δ, it is determined that the calculated system impedance at the current moment is valid, and the calculated system impedance at the current moment is stored in a system impedance history data buffer, to be used in calculating the system impedance next time. Here, the size of the system impedance history data buffer may be set as a fixed value N, where N is greater than or equal to 10. In a case that the difference between the calculated system impedance at the current moment and the averaged system impedance is greater than the deviation threshold δ, it indicates that the calculated system impedance at the current moment is not valid, and then the averaged system impedance is determined as the estimated system impedance at the current moment. The deviation threshold δ is related to the power grid system and the location of the wind turbine, and the deviation threshold δ may be set as a different value for a different location of a wind turbine. An engineering experience value of the deviation threshold δ is 10Ω, which is not limited in the present disclosure.

Specifically, the deviation threshold δ is related to the wind turbine system impedance at the grid-connected point. The deviation threshold may be set to a greater value if the system impedance at the grid-connected point is large, and the deviation threshold may be set to a smaller value if the system impedance at the grid-connected point is small. The system impedance at the grid-connected point is related to the grid system and the location of the wind turbine. Specifically, the system impedance at the grid-connected point is related to a system impedance of the station in the wind farm, a main transformer of a booster station in the wind farm, a length of a line from a low-voltage bus of the main transformer to a wind box transformer, and electrical parameters of the box transformer. A greater system impedance of the station in the wind farm indicates a greater system impedance at the grid-connected point, a longer distance between the wind turbine and the low-voltage bus of the station in the wind farm indicates a greater system impedance at the grid-connected point, and a greater leakage reactance of the box transformer or the main transformer indicates a greater system impedance at the grid-connected point. Otherwise, the system impedance at the grid-connected point will be smaller. In engineering applications, the deviation threshold δ may be set to an empirical value or be calculated based on the above items, which is not limited in the present disclosure.

In step S103, a total maximum capacitive reactive power capability and a total minimum inductive reactive power capability of the wind turbine group meeting a safety constraint condition at a next moment are determined based on the estimated system impedance at the grid-connected point, the operation data of each wind turbine at the current moment and the boundaries of the voltage safety range.

The safety constraint condition includes an impact of an actual reactive power of each wind turbine in the wind turbine group on an actual active power of the wind turbine at the current moment, an impact of the actual reactive power of each wind turbine in the wind turbine group on three-phase voltages at the grid side at the current moment, and an impact of the actual reactive power of each wind turbine in the wind turbine group on three-phase currents at the grid side at the current moment.

In an exemplary embodiment of the present disclosure, in determining the total maximum capacitive reactive power capability and the total minimum inductive reactive power capability of the wind turbine group meeting the safety constraint condition at the next moment, it may be calculated, for each wind turbine, a maximum capacitive reactive power capability and a minimum inductive reactive power capability of the wind turbine meeting the safety constraint condition at the next moment, based on the estimated system impedance at the current moment, the actual reactive power and three-phase voltages at the grid side of the wind turbine at the current moment, and the boundaries of the voltage safety range; and then calculated the total maximum capacitive reactive power capability and the total minimum inductive reactive power capability of the wind turbine group meeting the safety constraint condition at the next moment, based on maximum capacitive reactive power capabilities and minimum inductive reactive power capabilities of all wind turbines meeting the safety constraint condition at the next moment.

Specifically, the maximum capacitive reactive power capability $Q_{capmax}$ and the minimum inductive reactive power capability $Q_{indmin}$ of each wind turbine meeting the safety constraint condition at the next moment may be calculated according to the following equations, respectively:

$$Q_{capmax} = \frac{(V_{CapBundary} - V_+)V_{CapBundary}}{X} + \frac{Q_+ V_{CapBundary}}{V_+},$$

$$Q_{indmin} = \frac{(V_{IndBundary} - V_+)V_{Indbundary}}{X} + \frac{Q_+ V_{IndBundary}}{V_+}$$

Where the maximum capacitive reactive power capability $Q_{capmax}$ represents a maximum increasable reactive power capability of the wind turbine calculated under the current system condition without exceeding an upper boundary of the voltage safety range; the minimum inductive reactive power capability $Q_{indmin}$ represents a maximum reducible reactive power capability of the wind turbine calculated under the current system condition without exceeding a lower boundary of the voltage safety range; $V_{capBundary}$ represents the upper boundary of the voltage safety range of the wind turbine and may be configured based on an actual operation situation of the system; $V_{indBundary}$ represents the lower boundary of the voltage safety range of the wind turbine and may be configured based on the actual operation situation of the system; X represents a system impedance at the wind turbine under the current operation situation of the system; $Q_+$ represents current actual reactive power of the wind turbine; and $V_+$ represents a current voltage of the wind turbine.

In an exemplary embodiment of the present disclosure, the operation data of each wind turbine at the current moment further includes three-phase currents at the grid side of each wind turbine at the current moment. In calculating, for each wind turbine, a maximum capacitive reactive power capability and a minimum inductive reactive power capability of the wind turbine meeting the safety constraint condition at the next moment, based on the estimated system impedance at the current moment, the actual reactive power and the three-phase voltages at the grid side of the wind turbine at the current moment, and the boundaries of the voltage safety range, it may be firstly calculated, for each wind turbine, a maximum real-time capacitive reactive power capability and a maximum real-time inductive reactive power capability of the wind turbine at the current moment, based on the estimated system impedance at the current moment, the actual reactive power and the three-phase voltages at the grid side of the wind turbine at the current moment, and the boundaries of the voltage safety range; then, it may be determined, for each wind turbine, a safety constraint condition for an impact of the actual reactive power of the wind turbine on an actual active power of the wind turbine at the current moment, a safety constraint condition for an impact of the actual reactive power of the wind turbine on the three-phase voltages at the grid side of the wind turbine at the current moment, and a safety constraint condition for an impact of the actual reactive power of the wind turbine on the three-phase currents at the grid side of the wind turbine at the current moment, based on the maximum real-time capacitive reactive power capability and the maximum real-time inductive reactive power capability of the wind turbine at the current moment; and after then, it may be calculated, for each wind turbine, the maximum capacitive reactive power capability and the minimum inductive reactive power capability of the wind turbine meeting the safety constraint condition at the next moment, based on the calculated maximum real-time capacitive reactive power capability and the calculated maximum real-time inductive reactive power capability of the wind turbine at the current moment, the determined safety constraint condition for the impact of the actual reactive power of the wind turbine on the actual active power of the wind turbine at the current moment, the determined safety constraint condition for the impact of the actual reactive power of the wind turbine on the three-phase voltages at the grid side of the wind turbine at the current moment, and the determined safety constraint condition for the impact of the actual reactive power of the wind turbine on the three-phase currents at the grid side of the wind turbine at the current moment.

In an exemplary embodiment of the present disclosure, in calculating, for each wind turbine, the maximum real-time capacitive reactive power capability and the maximum real-time inductive reactive power capability of the wind turbine at the current moment, based on the estimated system impedance at the current moment, the actual reactive power and the three-phase voltages at the grid side of the wind turbine at the current moment, and the boundaries of the voltage safety range, it may be firstly calculated, for each wind turbine, an increasable capacitive reactive power and a reducible inductive reactive power of the wind turbine at the current moment, based on the estimated system impedance at the current moment, the actual reactive power and the three-phase voltages at the grid side of the wind turbine at the current moment, and the boundaries of the voltage safety range; then, it may be calculated, for each wind turbine, the maximum real-time capacitive reactive power capability and the maximum real-time inductive reactive power capability of the wind turbine at the current moment based on the actual reactive power, the increasable capacitive reactive power and the reducible inductive reactive power of the wind turbine at the current moment.

In an exemplary embodiment of the present disclosure, in determining, for each wind turbine, the safety constraint condition for the impact of the actual reactive power of the wind turbine on the actual active power of the wind turbine at the current moment, the safety constraint condition for the impact of the actual reactive power of the wind turbine on the three-phase voltages at the grid side of the wind turbine at the current moment, and the safety constraint condition for the impact of the actual reactive power of the wind turbine on the three-phase currents at the grid side of the wind turbine at the current moment, it may be calculated, for each wind turbine, a first reactive power capability range $[Q_{pmin}, Q_{pmax}]$ based on the actual active power of the wind turbine at the current moment, a second reactive power capability range $[Q_{vmin}, Q_{vmax}]$ based on the three-phase voltages at the grid side of the wind turbine at the current moment, and a third reactive power capability range $[Q_{imax}, Q_{imin}]$ based on the three-phase currents at the grid side of the wind turbine at the current moment.

Specifically, it may be calculated, for each wind turbine, the maximum real-time capacitive reactive power capability $Q_{jmax}$ and the maximum real-time inductive reactive power capability $Q_{jmin}$ of the wind turbine at the current moment respectively according to the following equations:

$$Q_{jmax} = \min(Q_{pmax}, Q_{vmax}, Q_{imax}, Q_{capmax}),$$

$$Q_{jmin} = (Q_{pmin}, Q_{vmin}, Q_{imin}, Q_{indmin}).$$

Specifically, it may be calculated the total maximum capacitive reactive power capability $Q_{capsum}$ and the total minimum inductive reactive power capability $Q_{incsum}$ of the wind turbine group meeting the safety constraint condition at the next moment respectively according to the following equations:

$$Q_{capsum} = \sum_{j=1}^{M} Q_{jmax},$$

$$Q_{incsum} = \sum_{j=1}^{M} Q_{jmin}.$$

In step S104, a reactive power command deviation of the wind turbine group at the current moment is calculated based on the reactive power command of each wind turbine at the current moment and the operation data of each wind turbine at the current moment.

In an exemplary embodiment of the present disclosure, the reactive power command deviation of the wind turbine group at the current moment may be calculated at any time after the operation data of each wind turbine in the wind turbine group at the current time is acquired, which is not limited in the present disclosure.

Specifically, the reactive power command deviation $\Delta Q_{sum}$ of the wind turbine group at the current moment may be equal to a difference between a reactive power command $Q_{sumcmd}$ of each wind turbine at the current moment and an actual reactive power $Q_{summeas}$ of each wind turbine at the current moment, which is expressed as:

$$\Delta Q_{sum} = Q_{sumcmd} - Q_{summeas}.$$

In step S105, the reactive power command of the wind turbine group is updated based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

Specifically, the reactive power command of each wind turbine may be updated based on the reactive power command deviation $\Delta Q_{sum}$ of the wind turbine group, the total capacitive reactive power capability $Q_{capsum}$ and the total inductive reactive power capability $Q_{incsum}$ of the wind turbine group, and the actual reactive power $Q_{summeas}$ of the wind turbine group. Such updating may be an equal allocation based on a reactive power capacity of each wind turbine, or may be an allocation based on a reactive power margin of each wind turbine, which is not limited in the present disclosure.

Figure 2:
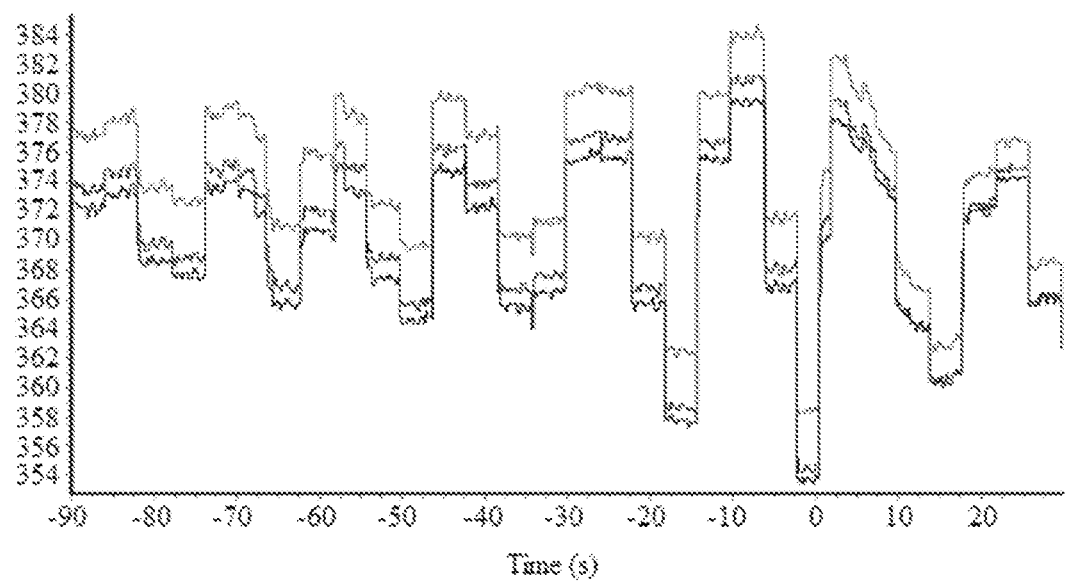
FIG. 2 shows a curve diagram of three-phase voltages at a grid side according to the conventional technology.
Figure 3:
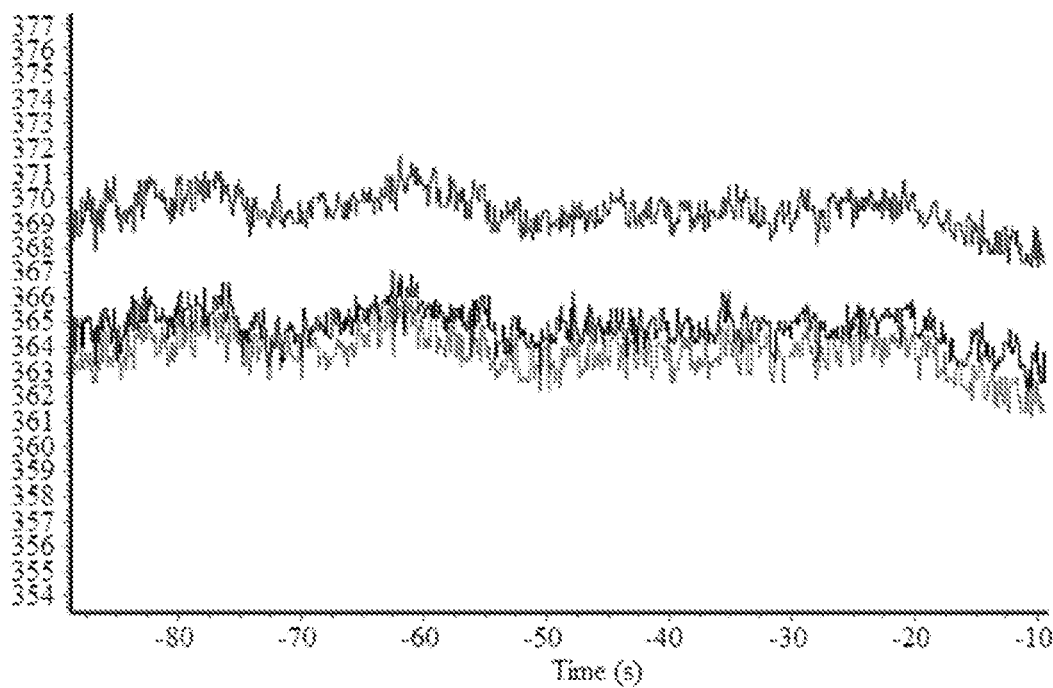
FIG. 3 shows a curve diagram of three-phase voltages at a grid side according to an exemplary embodiment of the present disclosure.
Figure 4:
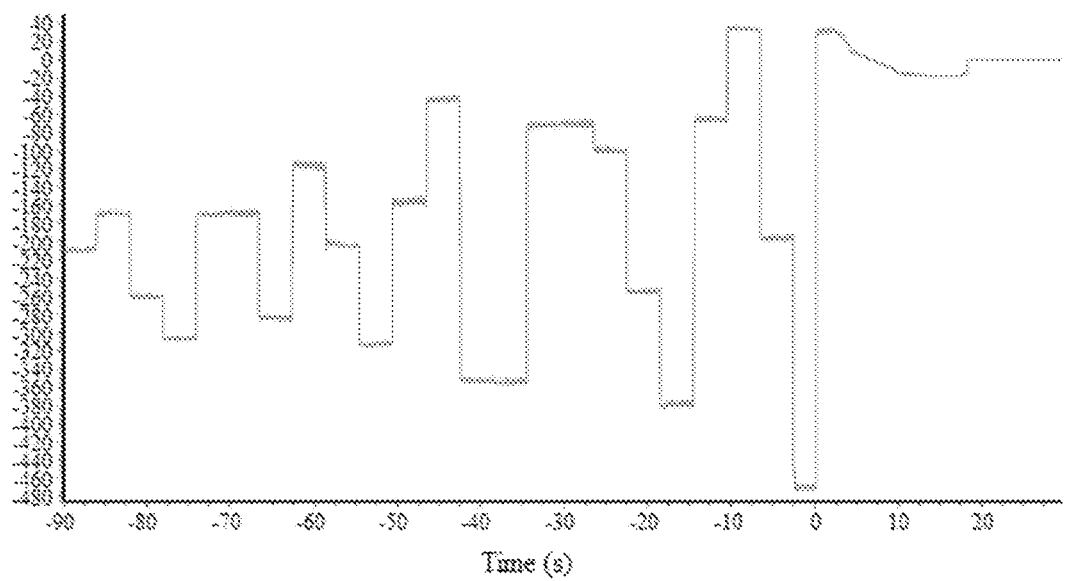
FIG. 4 shows a curve diagram of a reactive power command for a single wind turbine according to the conventional technology.
Figure 5:
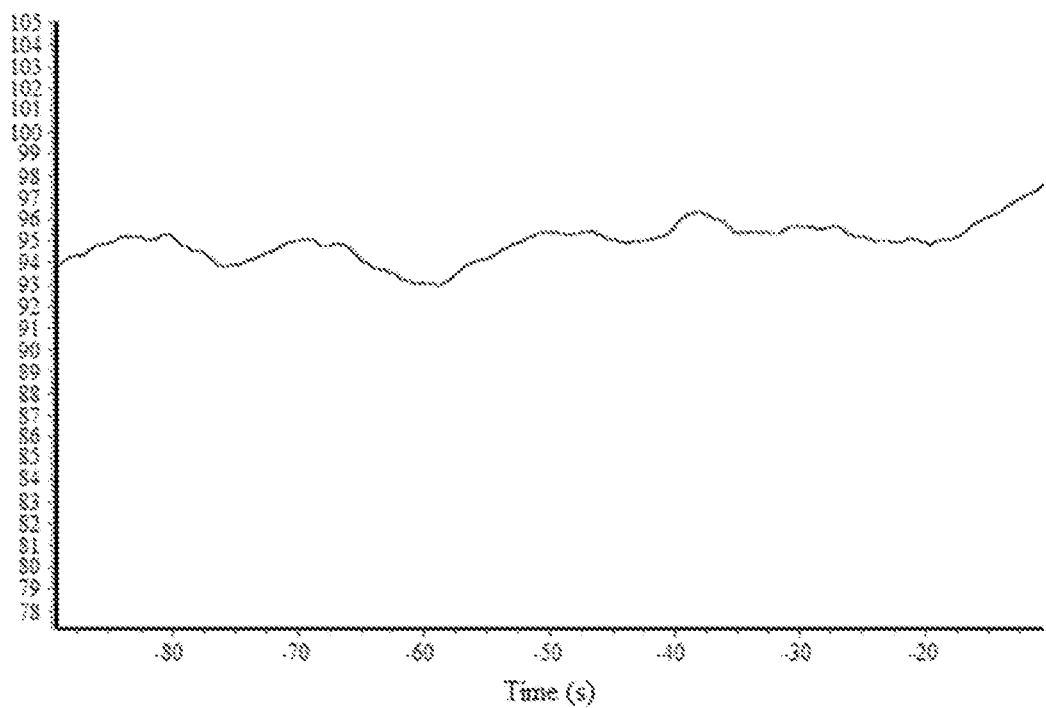
FIG. 5 shows a curve diagram of a reactive power command for a single wind turbine according to an exemplary embodiment of the present disclosure.

FIG. 2 shows a curve diagram of three-phase voltages at a grid side according to the conventional technology. FIG. 3 shows a curve diagram of three-phase voltages at a grid side according to an exemplary embodiment of the present disclosure. FIG. 4 shows a curve diagram of a reactive power command for a single wind turbine according to the conventional technology. FIG. 5 shows a curve diagram of a reactive power command for a single wind turbine according to an exemplary embodiment of the present disclosure.

In the conventional technology, a controller controls reactive power based on a static reactive power capacity of a wind turbine. Although the wind turbine has a maximum reactive power capacity accordingly at that time and outputs reactive power in response to a command, the wind turbine finally reports a low voltage fault due to a low reactive power output. Time instant '0' in FIG. 2 and FIG. 4 is fault time. In the exemplary embodiments of the present disclosure, by fast communication and updating a real-time reactive power capability of the wind turbine based on a real-time situation of the system, during the reactive power allocation, it is fully considered the possible impact of change in the reactive power of the wind turbine on the voltage of the wind turbine and on other restrictions in a case that the voltage of the wind turbine keeps at a low level, thereby effectively preventing the wind turbine from reporting a voltage fault of the wind turbine while meeting the conditions of the reactive power control. It can be seen from comparing FIG. 2 and FIG. 3 that, the three-phase voltages at the grid side in the exemplary embodiments of the present disclosure are stable. It can be seen from comparing FIG. 4 and FIG. 5 that, the reactive power command of the single wind turbine in the exemplary embodiments of the present disclosure is stable.

Figure 6A:
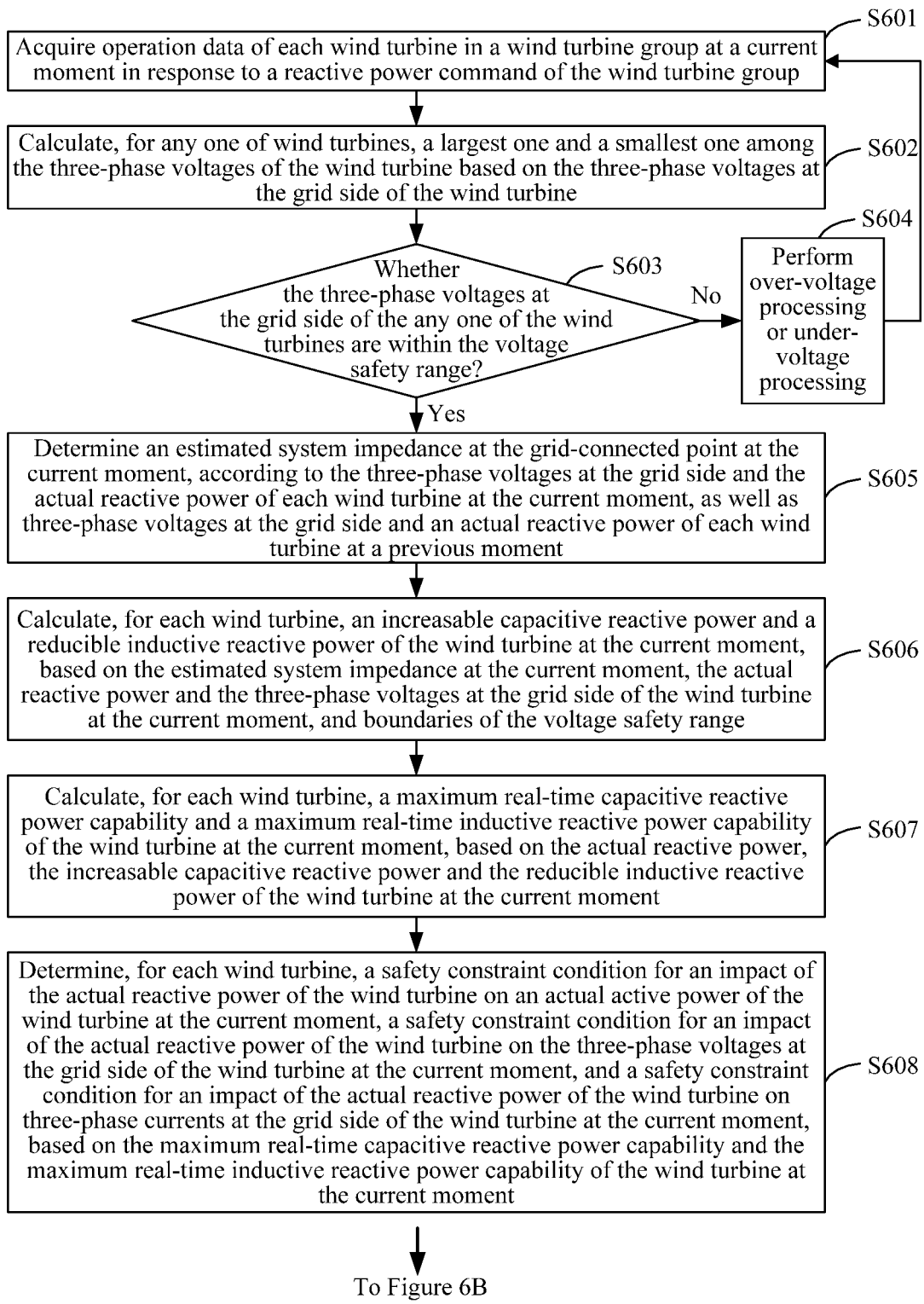
FIG. 6A and FIG. 6B show a flow chart of a method for controlling reactive power of a wind turbine according to an exemplary embodiment of the present disclosure.
Figure 6B:
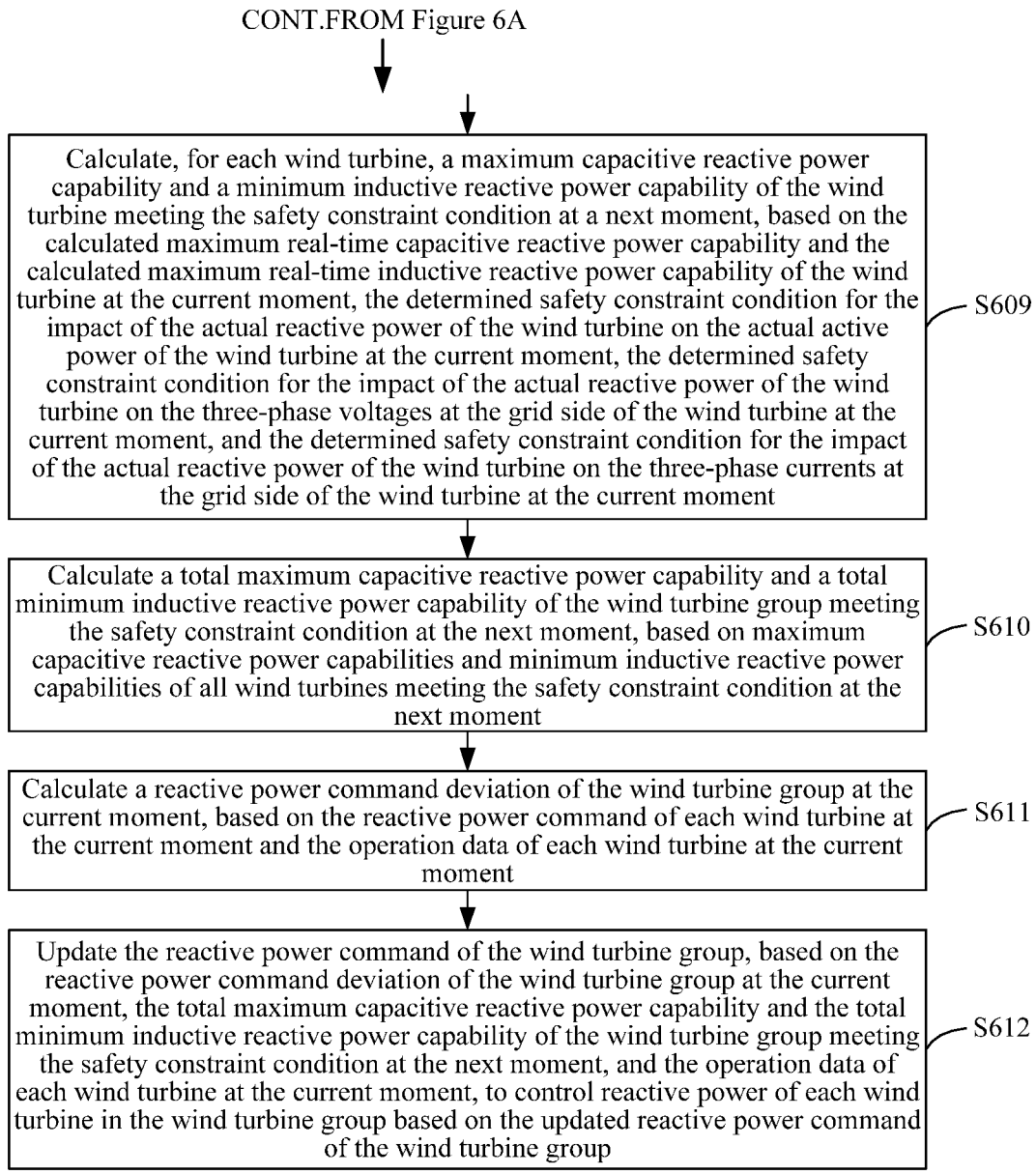

FIG. 6A and FIG. 6B show a flow chart of a method for controlling reactive power of a wind turbine according to an exemplary embodiment of the present disclosure.

Referring to FIG. 6A and FIG. 6B, in step S601, operation data of each wind turbine in a wind turbine group at a current moment is acquired in response to a reactive power command of the wind turbine group. Here, the reactive power command of the wind turbine group may include a reactive power command of each wind turbine, and the reactive power command of each wind turbine may include a reactive power command of a corresponding single wind turbine at the current moment. The operation data may at least include an actual reactive power, three-phase voltages at a gird side, and an actual active power. In addition, the operation data may further include three-phase currents at the grid side.

In step S602, for any one of wind turbines, a largest one and a smallest one among three-phase voltages of the wind turbine are calculated, based on the three-phase voltages at the grid side of the wind turbine.

In step S603, for any one of the wind turbines, it is determined whether the three-phase voltages at the grid side of the wind turbine are within the voltage safety range, based on the largest one and the smallest one among the three-phase voltages of the wind turbine. Proceed to step S604, in response to a positive determination; or, proceed to step S605 in response to a negative determination.

In step S604, over-voltage processing or under-voltage processing is performed when any one of the three-phase voltages at the grid side of the any one of wind turbines exceeds the voltage safety range.

In step S605, an estimated system impedance at a grid-connected point at the current moment is determined according to the three-phase voltages at the grid side and the actual reactive power of each wind turbine at the current moment, as well as three-phase voltages at the grid side and an actual reactive power of each wind turbine at a previous moment, when the over-voltage processing or the under-voltage processing is not required for each wind turbine.

In step S606, for each wind turbine, an increasable capacitive reactive power and a reducible inductive reactive power of the wind turbine at the current moment are calculated based on the estimated system impedance at the current moment, the actual reactive power and the three-phase voltages at the grid side of the wind turbine at the current moment, and boundaries of the voltage safety range.

In step S607, for each wind turbine, a maximum real-time capacitive reactive power capability and a maximum real-time inductive reactive power capability of the wind turbine at the current moment are calculated based on the actual reactive power, the increasable capacitive reactive power and the reducible inductive reactive power of the wind turbine at the current moment.

In step S608, for each wind turbine, a safety constraint condition for an impact of the actual reactive power of the wind turbine on an actual active power of the wind turbine at the current moment, a safety constraint condition for an impact of the actual reactive power of the wind turbine on the three-phase voltages at the grid side of the wind turbine at the current moment, and a safety constraint condition for an impact of the actual reactive power of the wind turbine on three-phase currents at the grid side of the wind turbine at the current moment are determined based on the maximum real-time capacitive reactive power capability and the maximum real-time inductive reactive power capability of the wind turbine at the current moment.

In step S609, for each wind turbine, a maximum capacitive reactive power capability and a minimum inductive reactive power capability of the wind turbine meeting the safety constraint condition at a next moment are calculated based on the calculated maximum real-time capacitive reactive power capability and the calculated maximum real-time inductive reactive power capability of the wind turbine at the current moment, the determined safety constraint condition for the impact of the actual reactive power of the wind turbine on the actual active power of the wind turbine at the current moment, the determined safety constraint condition for the impact of the actual reactive power of the wind turbine on the three-phase voltages at the grid side of the wind turbine at the current moment, and the determined safety constraint condition for the impact of the actual reactive power of the wind turbine on the three-phase currents at the grid side of the wind turbine at the current moment.

In step S610, a total maximum capacitive reactive power capability and a total minimum inductive reactive power capability of the wind turbine group meeting the safety constraint condition at the next moment are calculated based on maximum capacitive reactive power capabilities and minimum inductive reactive power capabilities of all wind turbines meeting the safety constraint condition at the next moment.

In step S611, a reactive power command deviation of the wind turbine group at the current moment is calculated based on the reactive power command of each wind turbine at the current moment and the operation data of each wind turbine at the current moment.

In step S612, the reactive power command of the wind turbine group is updated based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

The method for controlling reactive power of a wind turbine according to the exemplary embodiments of the present disclosure is described above in conjunction with FIG. 1 to FIG. 6A-6B. Hereinafter, an apparatus for controlling reactive power of a wind turbine and units thereof according to an exemplary embodiment of the present disclosure will be described with reference to FIG. 7.

Figure 7:
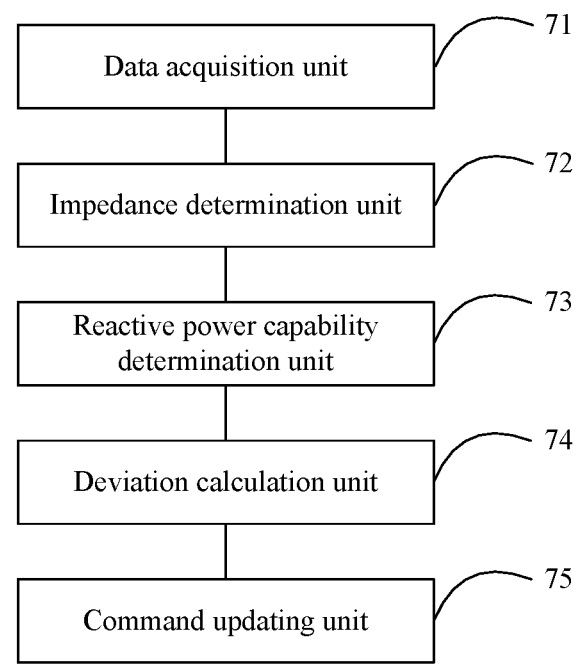
FIG. 7 shows a block diagram of an apparatus for controlling reactive power of a wind turbine according to an exemplary embodiment of the present disclosure.

FIG. 7 shows a block diagram of an apparatus for controlling reactive power of a wind turbine according to an exemplary embodiment of the present disclosure.

Referring to FIG. 7, the apparatus for controlling reactive power of a wind turbine includes: a data acquisition unit 71, an impedance determination unit 72, a reactive power capability determination unit 73, a deviation calculation unit 74, and a command updating unit 75.

The data acquisition unit 71 is configured to acquire operation data of each wind turbine in a wind turbine group at a current moment in response to a reactive power command of the wind turbine group. The reactive power command of the wind turbine group includes a reactive power command of each wind turbine, and the reactive power command of each wind turbine includes a reactive power command of a corresponding single wind turbine at the current moment. The operation data at least includes an actual reactive power, three-phase voltages at a grid side, and an actual active power.

The impedance determination unit 72 is configured to determine an estimated system impedance at a grid-connected point at the current moment based on the operation data of each wind turbine at the current moment.

In an exemplary embodiment of the present disclosure, the impedance determination unit 72 may be configured to determine the estimated system impedance at the grid-connected point at the current moment based on three-phase voltages at the grid side and an actual reactive power of each wind turbine at the current moment.

In an exemplary embodiment of the present disclosure, the impedance determination unit 72 may be further configured to: determine whether over-voltage processing or under-voltage processing is required for each wind turbine; determine that the over-voltage processing or the under-voltage processing is required when any one of three-phase voltages at the grid side of any one of wind turbines exceeds a voltage safety range; and determine the estimated system impedance at the grid-connected point at the current moment, according to three-phase voltages at the grid side and actual reactive power of each wind turbine at the current moment, as well as three-phase voltages at the grid side and an actual reactive power of each wind turbine at a previous moment, when the over-voltage processing or under-voltage processing is not required for each wind turbine.

In an exemplary embodiment of the present disclosure, the impedance determination unit 72 may be further configured to: calculate, for any one of wind turbines, a largest one and a smallest one among the three-phase voltages of the wind turbine based on the three-phase voltages at the grid side of the wind turbine; and determine whether the three-phase voltages at the grid side of the wind turbine are within the voltage safety range based on the largest one and the smallest one of the three-phase voltages of the wind turbine.

In an exemplary embodiment of the present disclosure, the impedance determination unit 72 may be further configured to: calculate a calculated system impedance at the grid-connected point at the current moment, based on the three-phase voltages at the grid side and the actual reactive power of each wind turbine at the current moment, as well as three-phase voltages at the grid side and actual reactive power of each wind turbine at a previous moment; compare the calculated system impedance at the current moment with an averaged system impedance; determine the calculated system impedance at the current moment as the estimated system impedance at the current moment, in a case that a difference between the calculated system impedance at the current moment and the averaged system impedance does not exceed a predetermined deviation range; and determine the averaged system impedance as the estimated system impedance at the current moment, in a case that a difference between the calculated system impedance at the current moment and the averaged system impedance exceeds the predetermined deviation range.

The reactive power capability determination unit 73 is configured to determine a total maximum capacitive reactive power capability and a total minimum inductive reactive power capability of the wind turbine group meeting a safety constraint condition at a next moment, based on the estimated system impedance, the operation data of each wind turbine at the current moment and boundaries of the voltage safety range.

In an exemplary embodiment of the present disclosure, the reactive power capability determination unit 73 may be configured to: calculate, for each wind turbine, a maximum capacitive reactive power capability and a minimum inductive reactive power capability of the wind turbine meeting the safety constraint condition at the next moment, based on the estimated system impedance at the current moment, the actual reactive power and the three-phase voltages at the grid side of the wind turbine at the current moment, and the boundaries of the voltage safety range; and calculate the total maximum capacitive reactive power capability and the total minimum inductive reactive power capability of the wind turbine group meeting the safety constraint condition at the next moment, based on maximum capacitive reactive power capabilities and minimum inductive reactive power capabilities of all wind turbines meeting the safety constraint condition at the next moment.

In an exemplary embodiment of the present disclosure, the operation data of each wind turbine at the current moment further includes three-phase currents at the grid side of each wind turbine at the current moment. In an exemplary embodiment of the present disclosure, the reactive power capability determination unit 73 may be configured to: calculate, for each wind turbine, a maximum real-time capacitive reactive power capability and a maximum real-time inductive reactive power capability of the wind turbine at the current moment, based on the estimated system impedance at the current moment, the actual reactive power and the three-phase voltages at the grid side of the wind turbine at the current moment, and the boundaries of the voltage safety range; determine, for each wind turbine, a safety constraint condition for an impact of an actual reactive power of the wind turbine on an actual active power of the wind turbine at the current moment, a safety constraint condition for an impact of the actual reactive power of the wind turbine on the three-phase voltages at the grid side of the wind turbine at the current moment, and a safety constraint condition for an impact of the actual reactive power of the wind turbine on the three-phase currents at the grid side of the wind turbine at the current moment, based on the maximum real-time capacitive reactive power capability and the maximum real-time inductive reactive power capability of the wind turbine at the current moment; and calculate, for each wind turbine, the maximum capacitive reactive power capability and the minimum inductive reactive power capability of the wind turbine meeting the safety constraint condition at the next moment, based on the calculated maximum real-time capacitive reactive power capability and the calculated maximum real-time inductive reactive power capability of the wind turbine at the current moment, the determined safety constraint condition for the impact of the actual reactive power of the wind turbine on the actual active power of the wind turbine at the current moment, the determined safety constraint condition for the impact of the actual reactive power of the wind turbine on the three-phase voltages at the grid side of the wind turbine at the current moment, and the determined safety constraint condition for the impact of the actual reactive power of the wind turbine on the three-phase currents at the grid side of the wind turbine at the current moment.

In an exemplary embodiment of the present disclosure, the reactive power capability determination unit 73 may be configured to: calculate, for each wind turbine, an increasable capacitive reactive power and a reducible inductive reactive power of the wind turbine at the current moment, based on the estimated system impedance at the current moment, the actual reactive power and the three-phase voltages at the grid side of the wind turbine at the current moment, and the boundaries of the voltage safety range; and calculate, for each wind turbine, the maximum real-time capacitive reactive power capability and the maximum real-time inductive reactive power capability of the wind turbine at the current moment based on the actual reactive power, the increasable capacitive reactive power and the reducible inductive reactive power of the wind turbine at the current moment.

In an exemplary embodiment of the present disclosure, the reactive power capability determination unit 73 may be configured to: calculate, for each wind turbine, a first reactive power capability range based on the actual active power of the wind turbine at the current moment, a second reactive power capability range based on the three-phase voltages at the grid side of the wind turbine at the current moment, and a third reactive power capability range based on the three-phase currents at the grid side of the wind turbine at the current moment.

The deviation calculation unit 74 is configured to calculate a reactive power command deviation of the wind turbine group at the current moment, based on the reactive power command of each wind turbine at the current moment and the operation data of each wind turbine at the current moment.

The command updating unit 75 is configured to update the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

Figure 8:
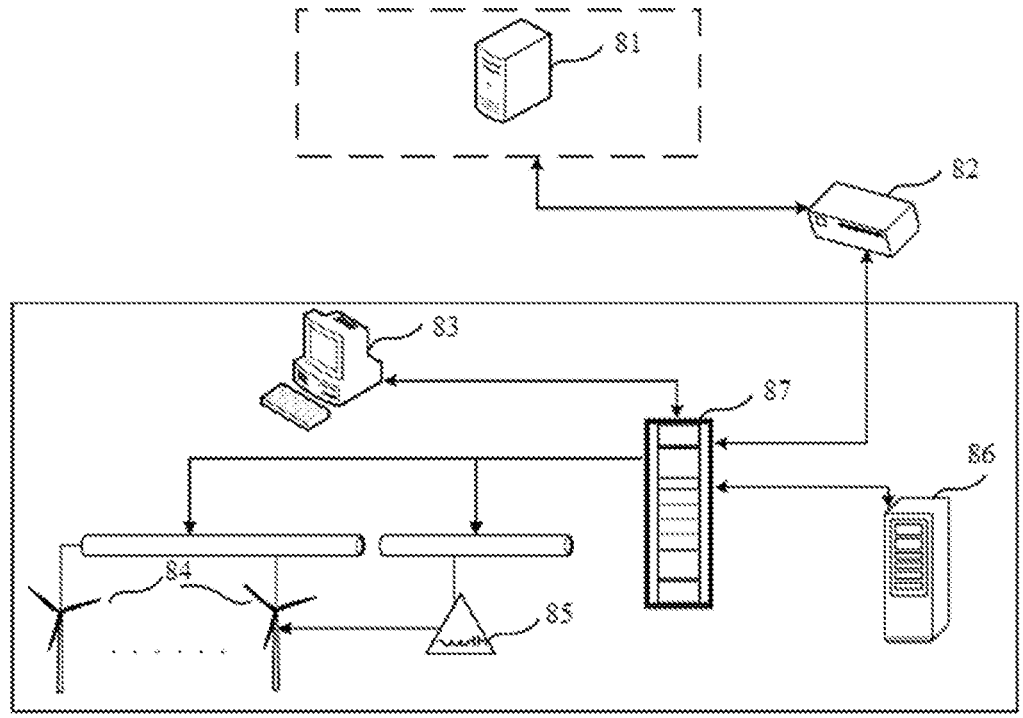
FIG. 8 shows a schematic diagram of a topological structure of a wind farm according to an exemplary embodiment of the present disclosure.

FIG. 8 shows a schematic diagram of a topological structure of a wind farm according to an exemplary embodiment of the present disclosure.

As shown in FIG. 8, the wind farm includes a wind turbine group, including at least one wind turbine 84 connected to a collection line; a reactive power compensation device 85, configured to provide reactive power compensation for the wind farm; a data collector 86, configured to collect operation data of each wind turbine in the wind turbine group at a current moment, where the operation data at least includes an actual reactive power, three-phase voltages at a grid side, and an actual active power; and a reactive power control device, communicatively connected with the at least one wind turbine, the reactive power compensation device and the data collector. The reactive power control device is configured to: determine a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment and boundaries of a voltage safety range; calculate a reactive power command deviation of the wind turbine group at the current moment, based on a reactive power command of each wind turbine at the current moment and the operation data of each wind turbine at the current moment; and update the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group. The safety constraint condition comprises an impact of an actual reactive power of each wind turbine in the wind turbine group on an actual active power of the wind turbine at the current moment, an impact of the actual reactive power of each wind turbine in the wind turbine group on the three-phase voltages at the grid side of the wind turbine at the current moment, and an impact of the actual reactive power of each wind turbine in the wind turbine group on three-phase currents at the grid side of the wind turbine at the current moment.

In an exemplary embodiment of the present disclosure, the reactive power control device is configured to determine the estimated system impedance at the grid-connected point at the current moment, based on the three-phase voltages at the grid side and the actual reactive power of each wind turbine at the current moment.

In an exemplary embodiment of the present disclosure, the reactive power control device is further configured to: calculate, for each wind turbine, a maximum capacitive reactive power capability and a minimum inductive reactive power capability of the wind turbine meeting the safety constraint condition at the next moment, based on the estimated system impedance at the current moment, the actual reactive power and the three-phase voltages at the grid side of the wind turbine at the current moment, and the boundaries of the voltage safety range; and calculate the total maximum capacitive reactive power capability and the total minimum inductive reactive power capability of the wind turbine group meeting the safety constraint condition at the next moment, based on maximum capacitive reactive power capabilities and minimum inductive reactive power capabilities of all wind turbines meeting the safety constraint condition at the next moment.

In an embodiment, as shown in FIG. 8, the reactive power control device may be a VMP management device 87. The VMP management device 87 is communicatively connected with a reactive power management platform (VMP) workstation 83, at least one wind turbine 84, a reactive power compensation device 85 and a data collector 86.

In an embodiment, as shown in FIG. 8, the reactive power control device may be an AVC control device 81. The automatic voltage control (AVC) device 81 is configured to issue a dispatching command, to realize a power grid dispatching function. A remote control device 82 is configured to perform functions of remote measurement, remote communication, remote control and remote regulation. The AVC device 81 is connected to the remote control device 82.

The AVC device 81 may be arranged in a power grid company, and the VMP workstation 83 may be arranged in a wind farm.

In an embodiment, the reactive power control device may also be a wind turbine group control device.

In an exemplary embodiment of the present disclosure, the VMP management device 87 is further configured to analyze, calculate and manage the collected data, to realize control and management of the reactive power.

In an exemplary embodiment of the present disclosure, the VMP management device 87 is communicatively connected with the AVC device through the remote control device.

The VMP management device 87 may perform two-way information interaction with at least one wind turbine 84 and adjustable reactive power devices such as the reactive power compensation device 85. Specifically, the VMP management device 87 may be installed with a VMP system so as to realize the above information interaction. The VMP system may be provided with multiple communication protocols to adapt to different dispatching frameworks.

Figure 9:
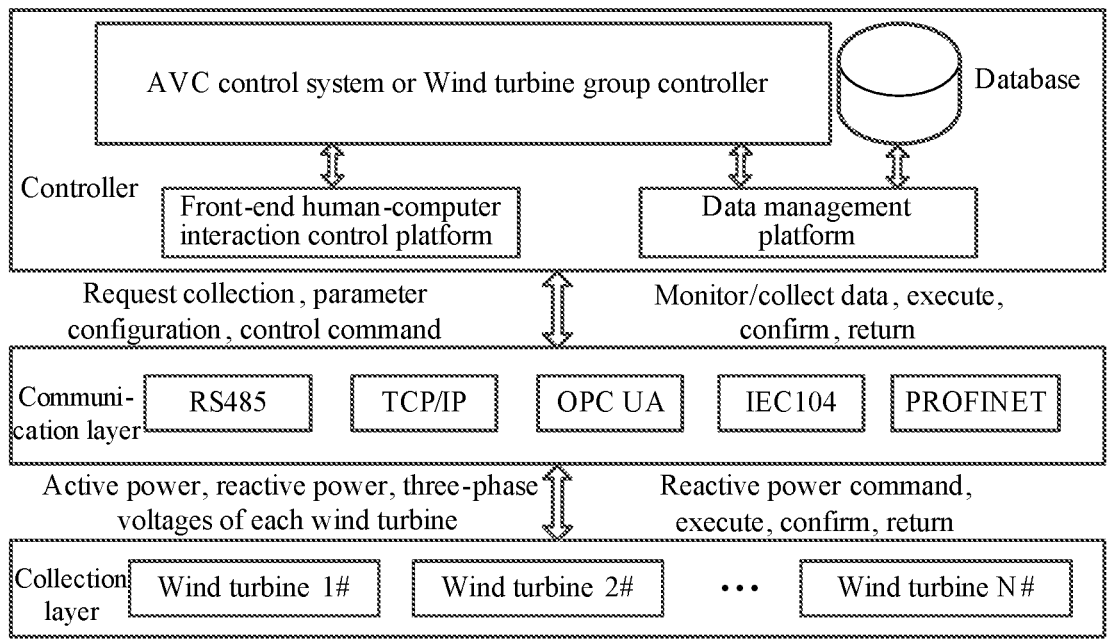
FIG. 9 shows a schematic diagram of an overall reactive control logic of a wind farm control system according to an exemplary embodiment of the present disclosure.

FIG. 9 shows a schematic diagram of an overall reactive control logic of a wind farm control system according to an exemplary embodiment of the present disclosure.

Referring to FIG. 9, the overall reactive control logic mainly includes three parts, that is, a controller, a communication layer and a collection layer.

The controller is a core part of a reactive voltage control strategy. The controller may be embodied as a station control level AVC system of a substation or a wind turbine group controller. The controller further includes a front-end human-computer interaction control platform, a data management platform and a database.

The communication layer is a main factor that affects an algorithm. The algorithm is based on current electrical parameters of the system to predict subsequent control and limitation and to make an adjustment based on the prediction. Therefore, the communication layer is required to ensure the rapidity and stability of the system. Moreover, stability is the prerequisite, and rapidity is the key. At present, there are many general communication protocols. Considering the requirements of real-time and rapidity, the communication protocol recommended is OPC UA or PROFINET.

The collection layer is configured to collect active power, reactive power, three-phase voltages and three-phase currents of a wind turbine in real time and quickly, transmit the collected data to the controller via the communication layer, regulate an actual output reactive power of a reactive power capability of a wind turbine in real time by using an adaptive algorithm based on the reactive power capability of the wind turbine, and quickly transmit a regulated reactive power command to the wind turbine.

According to an exemplary embodiment of the present disclosure, a computer readable storage medium is further provided. The computer readable storage medium stores a computer program. The computer program, when being executed, is configured to perform the method for controlling reactive power of a wind turbine according to the exemplary embodiments of the present disclosure.

In an exemplary embodiment of the present disclosure, the computer readable storage medium may store one or more programs. The computer program, when being executed, may perform the following steps:

acquire operation data of each wind turbine in a wind turbine group at a current moment in response to a reactive power command of the wind turbine group, where the reactive power command of the wind turbine group includes a reactive power command of each wind turbine at the current moment;

determine a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment and boundaries of a voltage safety range;

calculate a reactive power command deviation of the wind turbine group at the current moment, based on the reactive power command of each wind turbine at the current moment and the operation data of each wind turbine at the current moment; and update the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

The computer readable storage medium may be, but is not limited to, an electrical, magnetic, optical, electromagnetic, infrared, or semiconductor system, apparatus, or device, or any combination thereof. More specific examples of the computer readable storage medium may include, but are not limited to: electrical connection with one or more wires, portable computer disk, hard disk, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the embodiments of the present disclosure, the computer readable storage medium may be any tangible medium that contains or stores a computer program, and the computer program may be used by or in combination with an instruction execution system, apparatus, or device. The computer program stored in the computer readable storage medium may be transmitted by any suitable medium, including but not limited to: wire, optical cable, RF (Radio Frequency), or any suitable combination of the above. The computer readable storage medium may be arranged in any device, or may be separate without being arranged into the device.

The apparatus for controlling reactive power of a wind turbine and the wind farm according to the exemplary embodiments of the present disclosure have been described above in conjunction with FIG. 7 to FIG. 9. Hereinafter, a computing device according to an exemplary embodiment of the present disclosure will be described with reference to FIG. 10.

Figure 10:
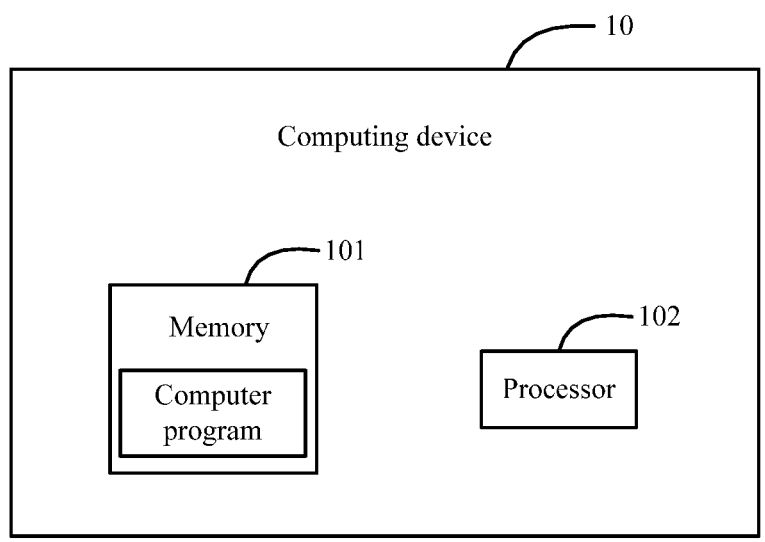
FIG. 10 shows a schematic diagram of a computing device according to an exemplary embodiment of the present disclosure.

FIG. 10 shows a schematic diagram of a computing device according to an exemplary embodiment of the present disclosure.

Referring to FIG. 10, the computing device 10 according to the exemplary embodiment of the present disclosure includes a memory 101 and a processor 102. The memory 101 stores a computer program. The computer program, when executed by the processor 102, is configured to perform the method for controlling reactive power of a wind turbine according to the exemplary embodiments of the present disclosure.

In an exemplary embodiment of the present disclosure, the computer program, when executed by the processor 102, may perform the following steps:
    acquire operation data of each wind turbine in a wind turbine group at a current moment in response to a reactive power command of the wind turbine group, where the reactive power command of the wind turbine group includes a reactive power command of each wind turbine at the current moment;
    determine a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment and boundaries of a voltage safety range;
    calculate a reactive power command deviation of the wind turbine group at the current moment, based on the reactive power command of each wind turbine at the current moment and the operation data of each wind turbine at the current moment; and
    update the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

The computing device shown in FIG. 10 is only an example, and should not bring any limitation to the function and usage scope of the embodiments of the present disclosure.

The method and the apparatus for controlling reactive power of a wind turbine, and the wind farm according to the exemplary embodiments of the present disclosure have been described above with reference to FIG. 1 to FIG. 10. However, it should be understood that the apparatus for controlling reactive power of a wind turbine and units thereof shown in FIG. 7 may be respectively configured as software, hardware, firmware or any combination of the above items that perform specific functions. The computing device shown in FIG. 10 is not limited to include the components shown above, but may add or remove some components as needed, and the above components may also be combined.

The method and the apparatus for controlling reactive power of a wind turbine according to the exemplary embodiments of the present disclosure are based on the adaptive evaluation of the reactive power capability of the wind turbine, which are mainly used to correctly evaluate the reactive power capability operated by the wind turbine during regulation of the reactive power of the wind farm, and reasonably allocate the reactive power of the wind turbine accordingly, so that the reactive power of each wind turbine and the overall reactive power of the wind turbine group meet the requirements in the control commands, to meet a reactive power control accuracy without exceeding the maximum real-time capacitive reactive power capability and the maximum real-time inductive reactive power capability of the wind turbine, and the wind turbine is prevented from entering into a faulty state due to changes in reactive power. Therefore, it is to prevent the wind turbine from reporting a fault due to an excessively high voltage or an excessively low voltage while guaranteeing the maximized utilization of reactive power capability of the wind turbine, and ensure that a single capability provided by the wind turbine to a reactive voltage regulation system of the wind turbine group is within an safety threshold range, and ensure that a reactive set value received by the wind turbine can be executed smoothly without affecting the safe and stable operation of the wind turbine. In addition, with the method and the apparatus for controlling reactive power of a wind turbine according to the exemplary embodiments of the present disclosure, the real-time reactive power capability of the wind turbine can be effectively regulated and evaluated based on the system situation, avoiding great errors in calculating the system impedance at the grid-connection point due to the fluctuation of the grid system, and thereby improving the regulation accuracy of the reactive power of the whole station.

Although the present disclosure is specifically shown and described with reference to exemplary embodiments thereof, those skilled in the art should understand that the present disclosure may be modified in forms and details without deviating from the spirit and the scope of the present disclosure as defined by the claims.

The invention claimed is:

1. A method for controlling reactive power of a wind turbine group, comprising:
    acquiring operation data of each wind turbine in the wind turbine group at a current moment in response to a reactive power command of the wind turbine group, wherein the reactive power command of the wind turbine group comprises a reactive power command of each wind turbine at the current moment;
    determining a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment, and boundaries of a voltage safety range, wherein the next moment is a moment after the current moment in a next control period;

calculating a reactive power command deviation of the wind turbine group at the current moment, based on the reactive power command of each wind turbine at the current moment and the operation data of each wind turbine at the current moment; and updating the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

2. The method according to claim 1, wherein the safety constraint condition comprises an impact of an actual reactive power of each wind turbine in the wind turbine group on an actual active power of the wind turbine at the current moment, an impact of the actual reactive power of each wind turbine in the wind turbine group on three-phase voltages at a grid side at the current moment, and an impact of the actual reactive power of each wind turbine in the wind turbine group on three-phase currents at the grid side at the current moment.

3. The method according to claim 1, wherein the estimated system impedance at the grid-connected point at the current moment is acquired by:

determining the estimated system impedance at the grid-connected point at the current moment, based on three-phase voltages at a grid side and an actual reactive power of each wind turbine at the current moment.

4. The method according to claim 1, wherein the determining a total maximum capacitive reactive power capability and a total minimum inductive reactive power capability of the wind turbine group meeting a safety constraint condition at a next moment comprises:

calculating, for each wind turbine, a maximum capacitive reactive power capability and a minimum inductive reactive power capability of the wind turbine meeting the safety constraint condition at the next moment, based on the estimated system impedance at the current moment, an actual reactive power and three-phase voltages at a grid-side of the wind turbine at the current moment, and the boundaries of the voltage safety range; and calculating the total maximum capacitive reactive power capability and the total minimum inductive reactive power capability of the wind turbine group meeting the safety constraint condition at the next moment, based on maximum capacitive reactive power capabilities and minimum inductive reactive power capabilities of all wind turbines meeting the safety constraint condition at the next moment.

5. The method according to claim 4, wherein the operation data of each wind turbine at the current moment comprises three-phase currents at the grid side of each wind turbine at the current moment, wherein, the calculating, for each wind turbine, a maximum capacitive reactive power capability and a minimum inductive reactive power capability of the wind turbine meeting the safety constraint condition at the next moment, based on the estimated system impedance at the current moment, an actual reactive power and three-phase voltages at a grid side of the wind turbine at the current moment, and the boundaries of the voltage safety range comprises:

calculating, for each wind turbine, a maximum real-time capacitive reactive power capability and a maximum real-time inductive reactive power capability of the wind turbine at the current moment, based on the estimated system impedance at the current moment, the actual reactive power and the three-phase voltages at the grid side of the wind turbine at the current moment, and the boundaries of the voltage safety range;

determining, for each wind turbine, a safety constraint condition for an impact of an actual reactive power of the wind turbine on an actual active power of the wind turbine at the current moment, a safety constraint condition for an impact of the actual reactive power of the wind turbine on the three-phase voltages at the grid side of the wind turbine at the current moment, and a safety constraint condition for an impact of the actual reactive power of the wind turbine on the three-phase currents at the grid side of the wind turbine at the current moment, based on the maximum real-time capacitive reactive power capability and the maximum real-time inductive reactive power capability of the wind turbine at the current moment; and calculating, for each wind turbine, the maximum capacitive reactive power capability and the minimum inductive reactive power capability of the wind turbine meeting the safety constraint condition at the next moment, based on the calculated maximum real-time capacitive reactive power capability and the calculated maximum real-time inductive reactive power capability of the wind turbine at the current moment, the determined safety constraint condition for the impact of the actual reactive power of the wind turbine on the actual active power of the wind turbine at the current moment, the determined safety constraint condition for the impact of the actual reactive power of the wind turbine on the three-phase voltages at the grid side of the wind turbine at the current moment, and the determined safety constraint condition for the impact of the actual reactive power of the wind turbine on the three-phase currents at the grid side of the wind turbine at the current moment.

6. The method according to claim 5, wherein the calculating, for each wind turbine, a maximum real-time capacitive reactive power capability and a maximum real-time inductive reactive power capability of the wind turbine at the current moment based on the estimated system impedance at the current moment, the actual reactive power and the three-phase voltages at the grid side of the wind turbine at the current moment, and the boundaries of the voltage safety range comprises:

calculating, for each wind turbine, an increasable capacitive reactive power and a reducible inductive reactive power of the wind turbine at the current moment, based on the estimated system impedance at the current moment, the actual reactive power and the three-phase voltages at the grid side of the wind turbine at the current moment, and the boundaries of the voltage safety range; and calculating, for each wind turbine, the maximum real-time capacitive reactive power capability and the maximum real-time inductive reactive power capability of the wind turbine at the current moment based on the actual reactive power, the increasable capacitive reactive power and the reducible inductive reactive power of the wind turbine at the current moment.

7. The method according to claim 3, wherein the determining the estimated system impedance at the grid-connected point at the current moment, based on three-phase voltages at a grid side and an actual reactive power of each wind turbine at the current moment comprises:
determining whether over-voltage processing or under-voltage processing is required for each wind turbine, wherein it is determined that the over-voltage processing or the under-voltage processing is required when any one of three-phase voltages at the grid side of any one of wind turbines exceeds the voltage safety range; and
determining the estimated system impedance at the grid-connected point at the current moment, according to the three-phase voltages at the grid side and the actual reactive power of each wind turbine at the current moment, as well as three-phase voltages at the grid side and an actual reactive power of each wind turbine at a previous moment, when the over-voltage processing or under-voltage processing is not required for each wind turbine.

8. The method according to claim 7, wherein the determining whether over-voltage processing or under-voltage processing is required comprises:
calculating, for any one of the wind turbines, a largest one and a smallest one of the three-phase voltages of the wind turbine based on the three-phase voltages at the grid side of the wind turbine, and determining whether the three-phase voltages at the grid side of the wind turbine are within the voltage safety range based on the largest one and the smallest one of the three-phase voltages of the wind turbine.

9. The method according to claim 7, wherein the determining the estimated system impedance at the grid-connected point at the current moment, based on the three-phase voltages at the grid side and the actual reactive power of each wind turbine at the current moment, as well as three-phase voltages at the grid side and an actual reactive power of each wind turbine at a previous moment comprises:
calculating a calculated system impedance at the grid-connected point at the current moment, based on the three-phase voltages at the grid side and the actual reactive power of each wind turbine at the current moment, as well as the three-phase voltages at the grid side and the actual reactive power of each wind turbine at the previous moment;
comparing the calculated system impedance at the current moment with an averaged system impedance;
determining the calculated system impedance at the current moment as the estimated system impedance at the current moment, in a case that a difference between the calculated system impedance at the current moment and the averaged system impedance does not exceed a predetermined deviation range; and
determining the averaged system impedance as the estimated system impedance at the current moment, in a case that the difference between the calculated system impedance at the current moment and the averaged system impedance exceeds the predetermined deviation range.

10. An apparatus for controlling reactive power of a wind turbine group, comprising:
a data acquisition unit, configured to acquire operation data of each wind turbine in the wind turbine group at a current moment in response to a reactive power command of the wind turbine group, wherein the reactive power command of the wind turbine group comprises a reactive power command of each wind turbine at the current moment;
a reactive power capability determination unit, configured to determine a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment, and boundaries of a voltage safety range, wherein the next moment is a moment after the current moment in a next control period;
a deviation calculation unit, configured to calculate a reactive power command deviation of the wind turbine group at the current moment, based on the reactive power command of each wind turbine at the current moment and the operation data of each wind turbine at the current moment; and
a command updating unit, configured to update the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, so as to control reactive power of each wind turbine in the wind turbine group based on the updated reactive power command of the wind turbine group.

11. A wind farm, comprising:
a wind turbine group, comprising at least one wind turbine connected to a collection line;
a reactive power compensation device, configured to provide reactive power compensation for the wind farm;
a data collector, configured to collect operation data of each wind turbine in the wind turbine group at a current moment, wherein the operation data at least comprises an actual reactive power, three-phase voltages at a grid side, and an actual active power; and
a reactive power control device, communicatively connected with the at least one wind turbine, the reactive power compensation device and the data collector, wherein the reactive power control device is configured to:
determine a total maximum capacitive reactive power capability and a total minimum inductive reactive power capability of the wind turbine group meeting a safety constraint condition at a next moment, based on an estimated system impedance at a grid-connected point at the current moment, the operation data of each wind turbine at the current moment, and boundaries of a voltage safety range, wherein the next moment is a moment after the current moment in a next control period;
calculate a reactive power command deviation of the wind turbine group at the current moment, based on the reactive power command of each wind turbine at the current moment and the operation data of each wind turbine at the current moment; and
update the reactive power command of the wind turbine group, based on the reactive power command deviation of the wind turbine group at the current moment, the total maximum capacitive reactive power capability and the total minimum inductive reactive power capability of the wind turbine group meeting the safety constraint condition at the next moment, and the operation data of each wind turbine at the current moment, to control reactive power of each wind turbine in the wind turbine group based on the updated reactive power command of the wind turbine group.

12. The wind farm according to claim 11, wherein the safety constraint condition comprises an impact of an actual reactive power of each wind turbine in the wind turbine group on an actual active power of the wind turbine at the current moment, an impact of the actual reactive power of each wind turbine in the wind turbine group on the three-phase voltages at the grid side at the current moment, and an impact of the actual reactive power of each wind turbine in the wind turbine group on three-phase currents at the grid side at the current moment.

13. The wind farm according to claim 11, wherein the reactive power control device is configured to:
   determine the estimated system impedance at the grid-connected point at the current moment, based on the three-phase voltages at the grid side and the actual reactive power of each wind turbine at the current moment.

14. The wind farm according to claim 11, wherein the reactive power control device is configured to:
   calculate, for each wind turbine, a maximum capacitive reactive power capability and a minimum inductive reactive power capability of the wind turbine meeting the safety constraint condition at the next moment, based on the estimated system impedance at the current moment, the actual reactive power and the three-phase voltages at the grid side of the wind turbine at the current moment, and the boundaries of the voltage safety range; and
   calculate the total maximum capacitive reactive power capability and the total minimum inductive reactive power capability of the wind turbine group meeting the safety constraint condition at the next moment, based on maximum capacitive reactive power capabilities and minimum inductive reactive power capabilities of all wind turbines meeting the safety constraint condition at the next moment.

15. The wind farm according to claim 11, wherein the reactive power control device is one of a reactive voltage control device, a reactive power/voltage management platform device and a wind turbine group control device.

16. The wind farm according to claim 11, wherein
   the reactive power compensation device comprises a static var compensator and/or a static var generator, and
   the data collector comprises a voltage transformer and/or a current transformer.

17. The wind farm according to claim 13, wherein the reactive power control device is configured to:
   determine whether over-voltage processing or under-voltage processing is required for each wind turbine, wherein it is determined that the over-voltage processing or the under-voltage processing is required when any one of three-phase voltages at the grid side of any one of wind turbines exceeds the voltage safety range; and
   determine the estimated system impedance at the grid-connected point at the current moment, according to the three-phase voltages at the grid side and the actual reactive power of each wind turbine at the current moment, as well as three-phase voltages at the grid side and an actual reactive power of each wind turbine at a previous moment, when the over-voltage processing or under-voltage processing is not required for each wind turbine.

18. The wind farm according to claim 17, wherein the reactive power control device is further configured to:
   calculate, for any one of the wind turbines, a largest one and a smallest one among the three-phase voltages of the wind turbine based on the three-phase voltages at the grid side of the wind turbine, and determine whether the three-phase voltages at the grid side of the wind turbine are within the voltage safety range based on the largest one and the smallest one of the three-phase voltages of the wind turbine.

19. The wind farm according to claim 17, wherein the reactive power control device is further configured to:
   calculate a calculated system impedance at the grid-connected point at the current moment, based on the three-phase voltages at the grid side and the actual reactive power of each wind turbine at the current moment, as well as the three-phase voltages at the grid side and the actual reactive power of each wind turbine at the previous moment;
   compare the calculated system impedance at the current moment with an averaged system impedance;
   determine the calculated system impedance at the current moment as the estimated system impedance at the current moment, in a case that a difference between the calculated system impedance at the current moment and the averaged system impedance does not exceed a predetermined deviation range; and
   determine the averaged system impedance as the estimated system impedance at the current moment, in a case that a difference between the calculated system impedance at the current moment and the averaged system impedance exceeds the predetermined deviation range.

20. A non-transitory computer-readable storage medium storing a computer program, wherein the computer program, when executed by a processor, performs the method for controlling reactive power of a wind turbine according to claim 1.

* * * * *